(12) United States Patent
Ramos Robles et al.

(10) Patent No.: US 7,848,737 B2
(45) Date of Patent: Dec. 7, 2010

(54) APPARATUS AND METHOD FOR FRAUD PREVENTION WHEN ACCESSING THROUGH WIRELESS LOCAL AREA NETWORKS

(75) Inventors: Luis Ramos Robles, Coslada (ES); Susana Fernandez Alonso, Madrid (ES); Victor Manuel Avila Gonzalez, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 737 days.

(21) Appl. No.: 11/718,872

(22) PCT Filed: Nov. 9, 2004

(86) PCT No.: PCT/SE2004/001636

§ 371 (c)(1),
(2), (4) Date: May 8, 2007

(87) PCT Pub. No.: WO2006/052170

PCT Pub. Date: May 18, 2006

(65) Prior Publication Data

US 2008/0009267 A1    Jan. 10, 2008

(51) Int. Cl.
*H04M 1/66* (2006.01)

(52) U.S. Cl. .................. 455/411; 455/406; 455/410

(58) Field of Classification Search .............. None
See application file for complete search history.

(56) References Cited

U.S. PATENT DOCUMENTS

| | | | |
|---|---|---|---|
| 2004/0203751 A1* | 10/2004 | Banaei | 455/432.1 |
| 2005/0177515 A1* | 8/2005 | Kalavade et al. | 705/52 |
| 2007/0042752 A1* | 2/2007 | Uhlik et al. | 455/406 |

OTHER PUBLICATIONS

L Bunk, et al: "PPP Extensible Authentication Protocol (EAP)" IETF RFC 2284, Mar. 1998.
Haverinen, et al: "EAP SIM Authentication", draft-haverinen-pppext-eap-sim-12, IETF RFC, Oct. 2003.
Arkko, et al: "EAP AKA Authentication", draft-arkko-pppext-eap-aka-11, IETF RFC, Oct. 2003.

* cited by examiner

*Primary Examiner*—Erika A Gary

(57) ABSTRACT

The present invention addresses the problem of detecting possible fraud situations where there may be a plurality of access sessions simultaneously active in a user session for a user, the access sessions established through a number of access points of one or more wireless local area networks (WLAN). Therefore, the present invention provides for a mechanism, which includes means and method, whereby user sessions suspicious of fraud are reported to the operator network holding a subscription for the user. Moreover, the present invention also facilitates support for Single Sign-On services for a user.

25 Claims, 12 Drawing Sheets

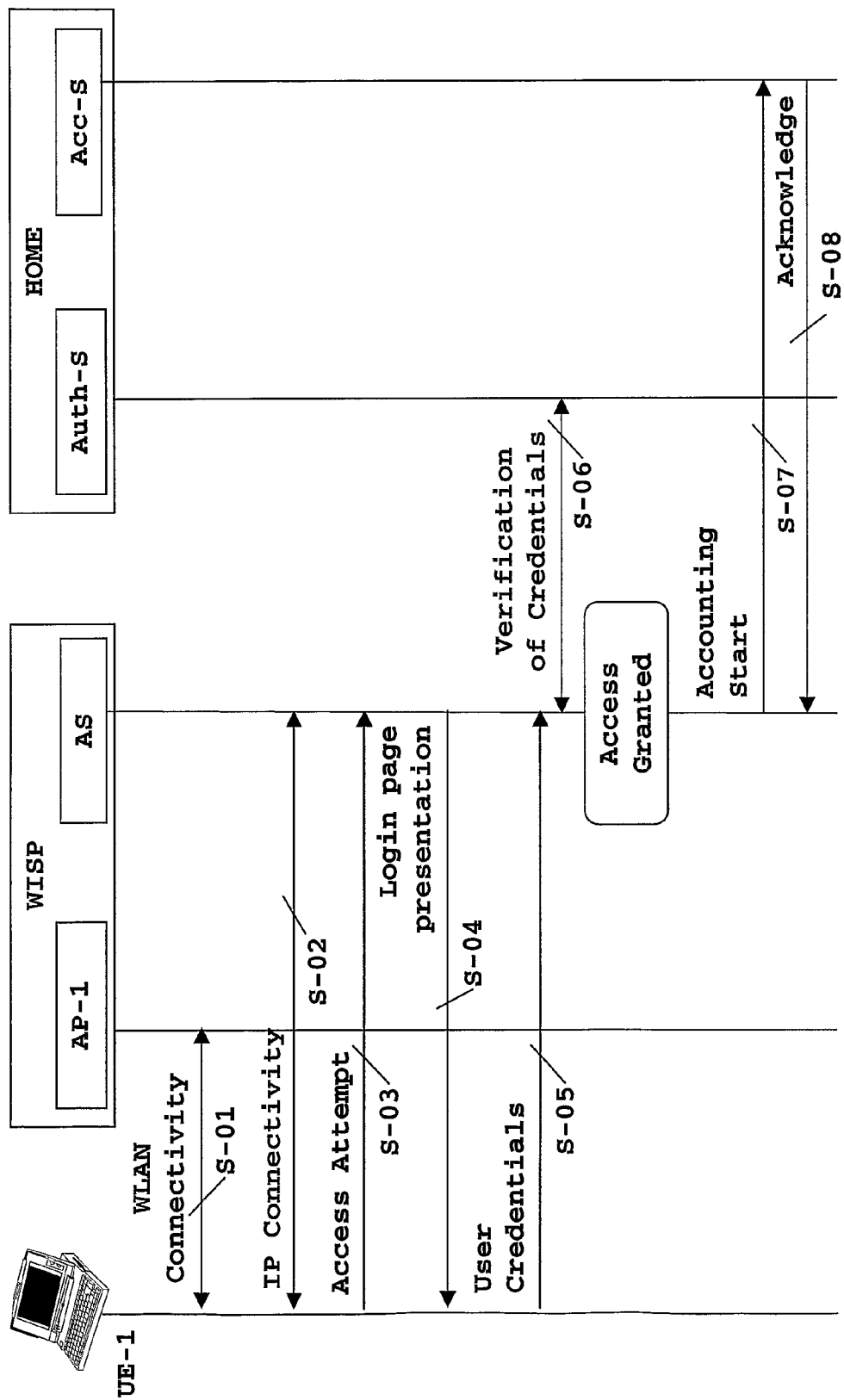
FIG.-1-
Prior Art

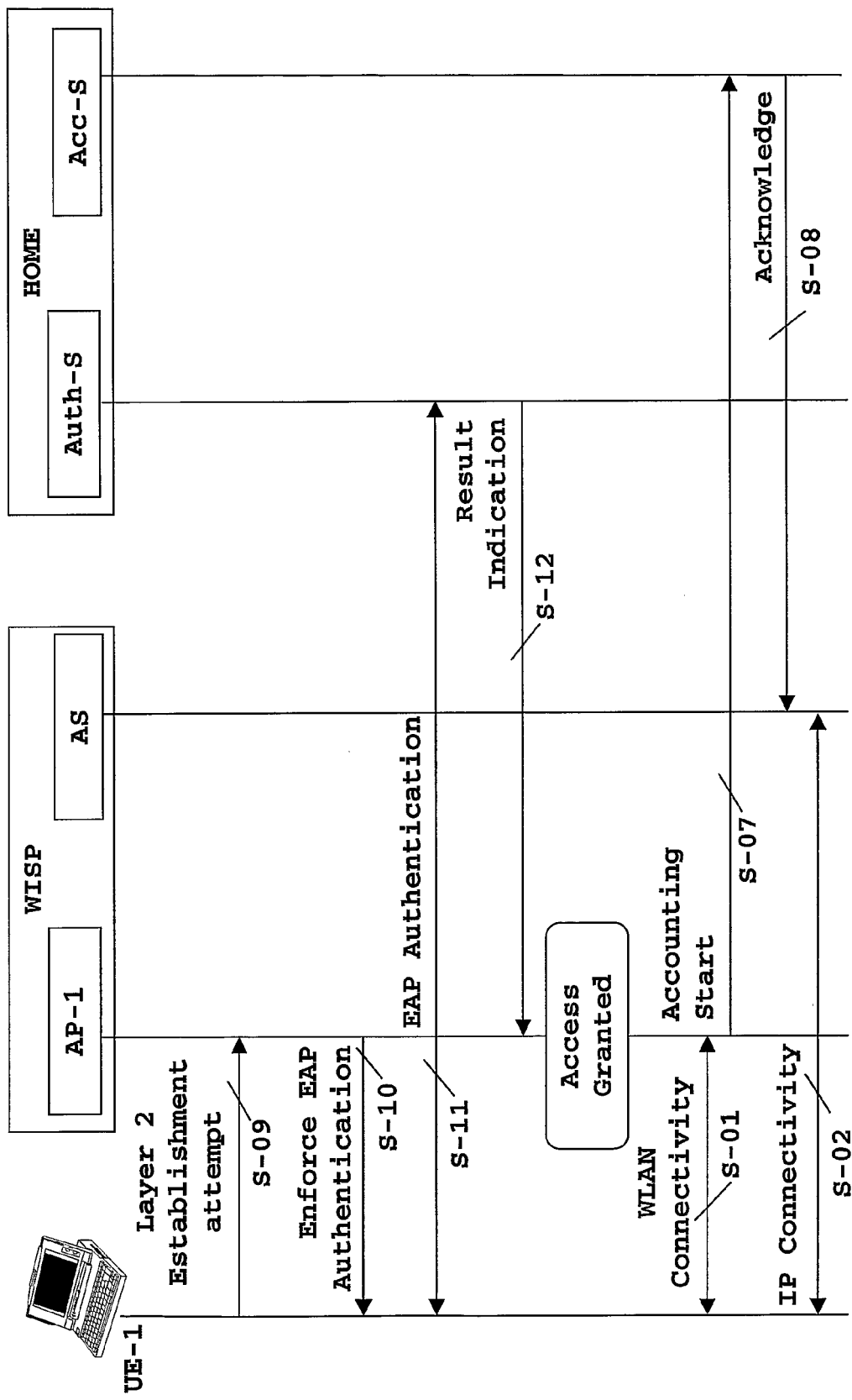
FIG.-2-
Prior Art

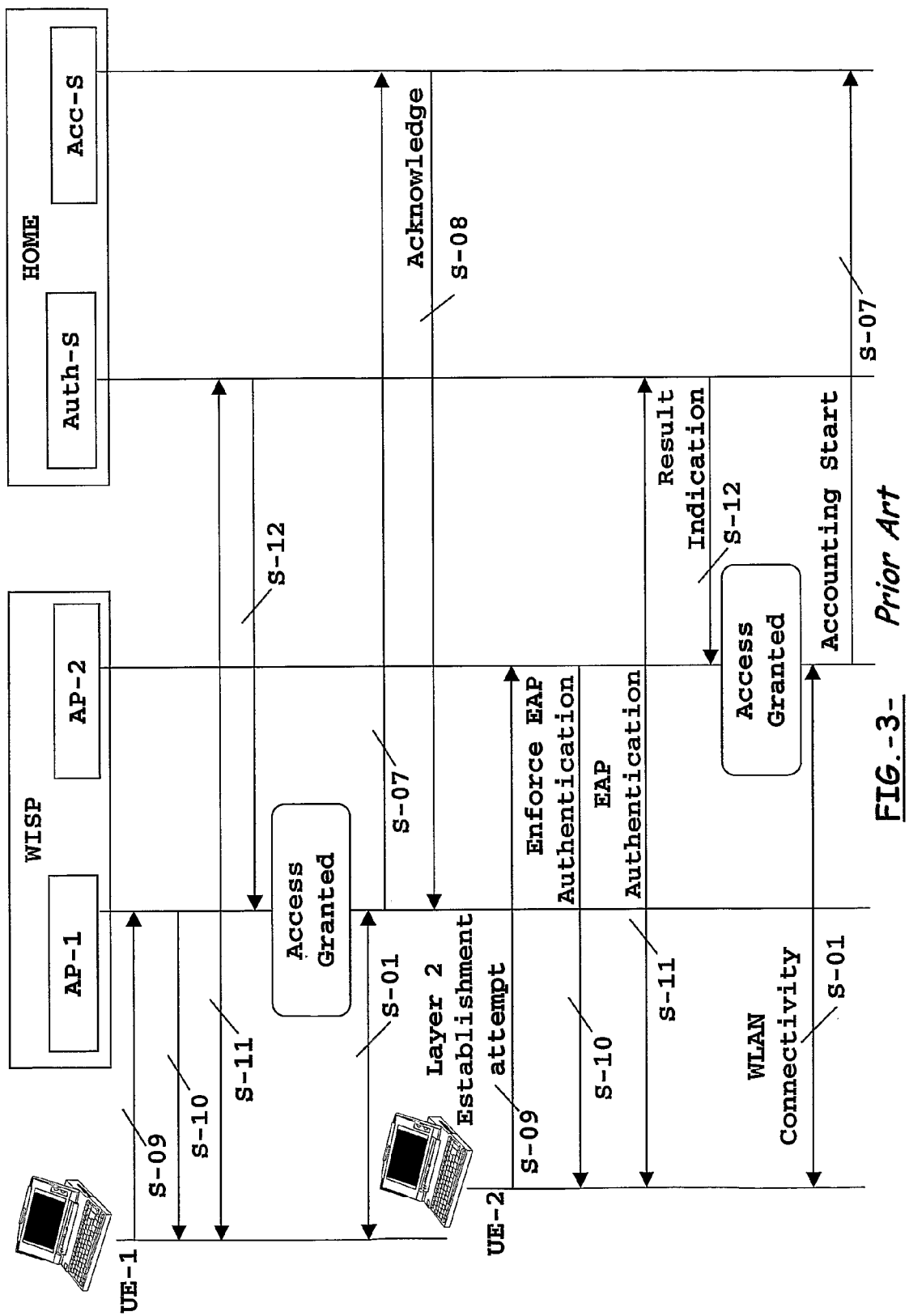
FIG.-3- Prior Art

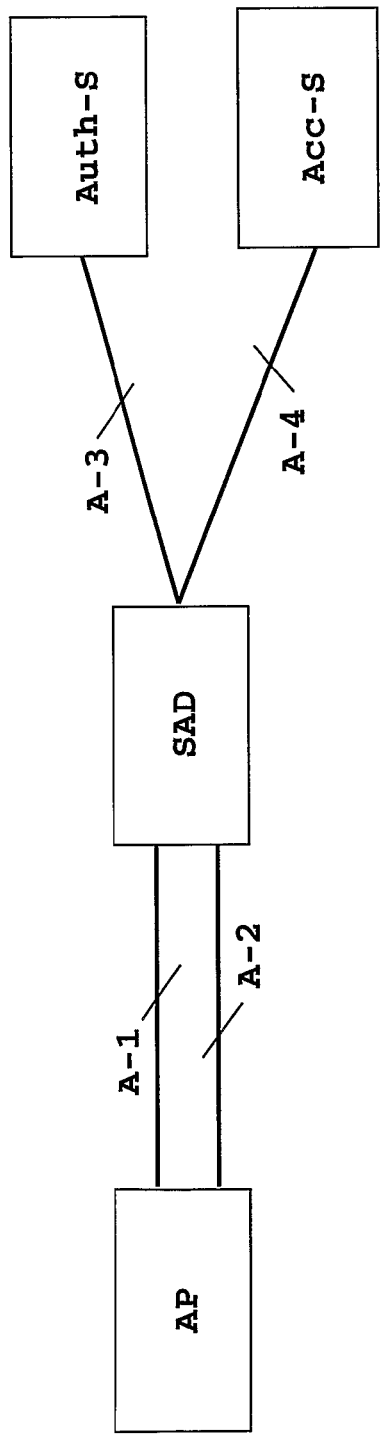
FIG.-4-
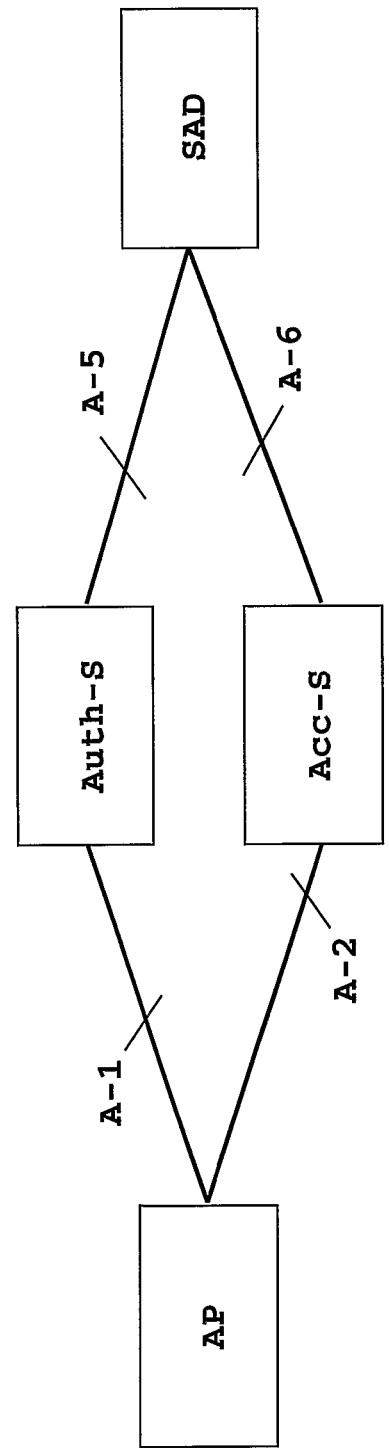
FIG.-5-

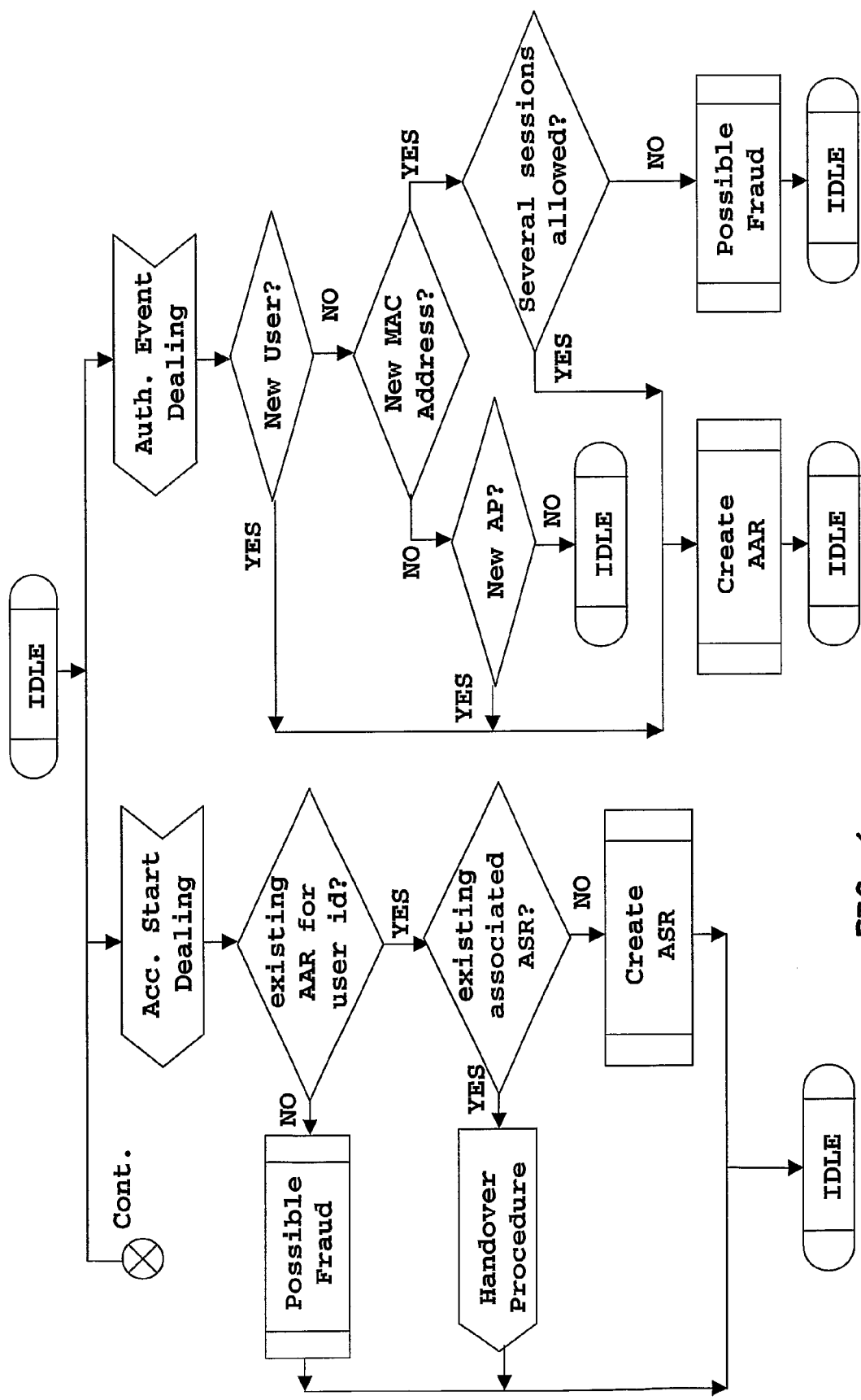
FIG.-6a-

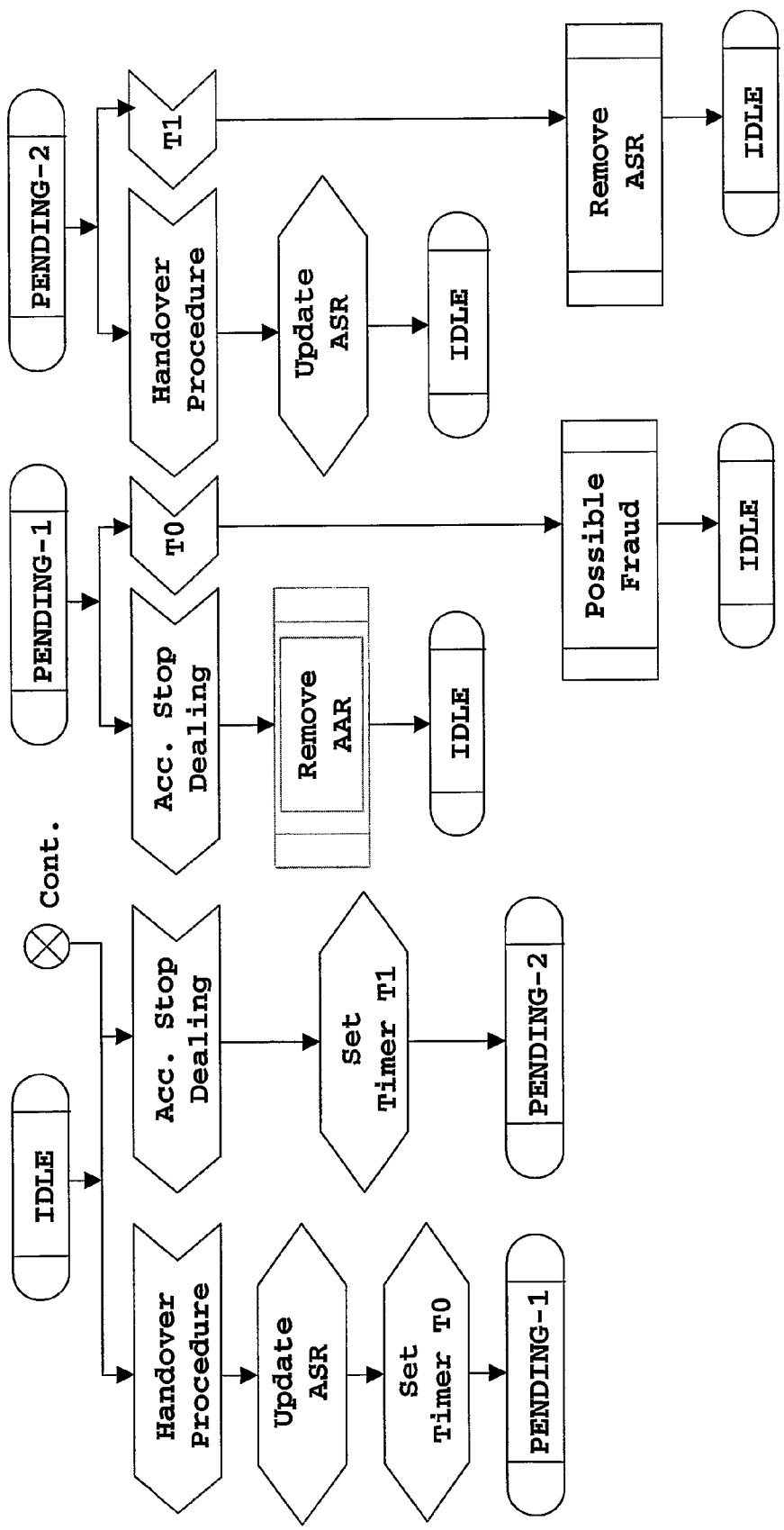
FIG. -6b-

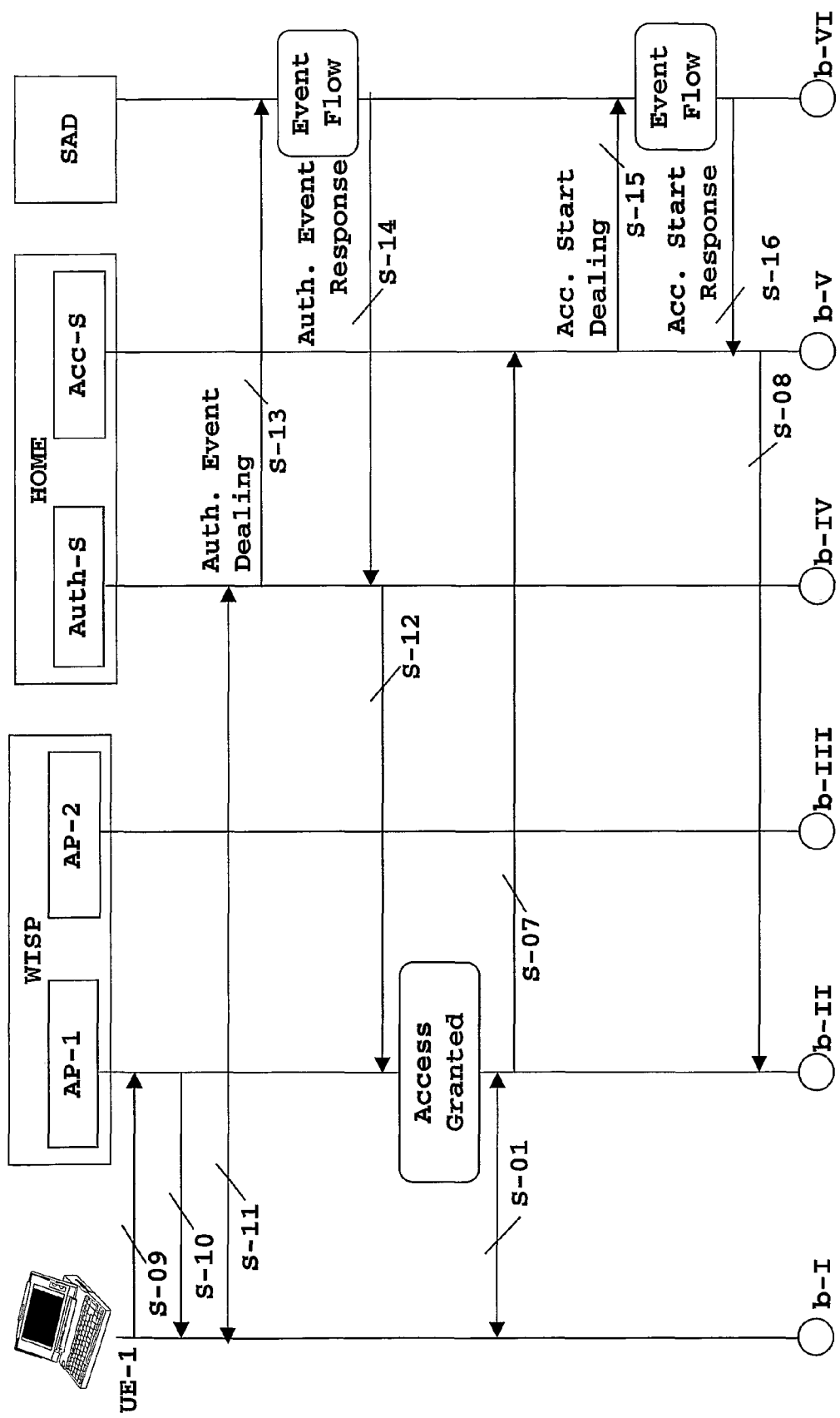
FIG.-7a-

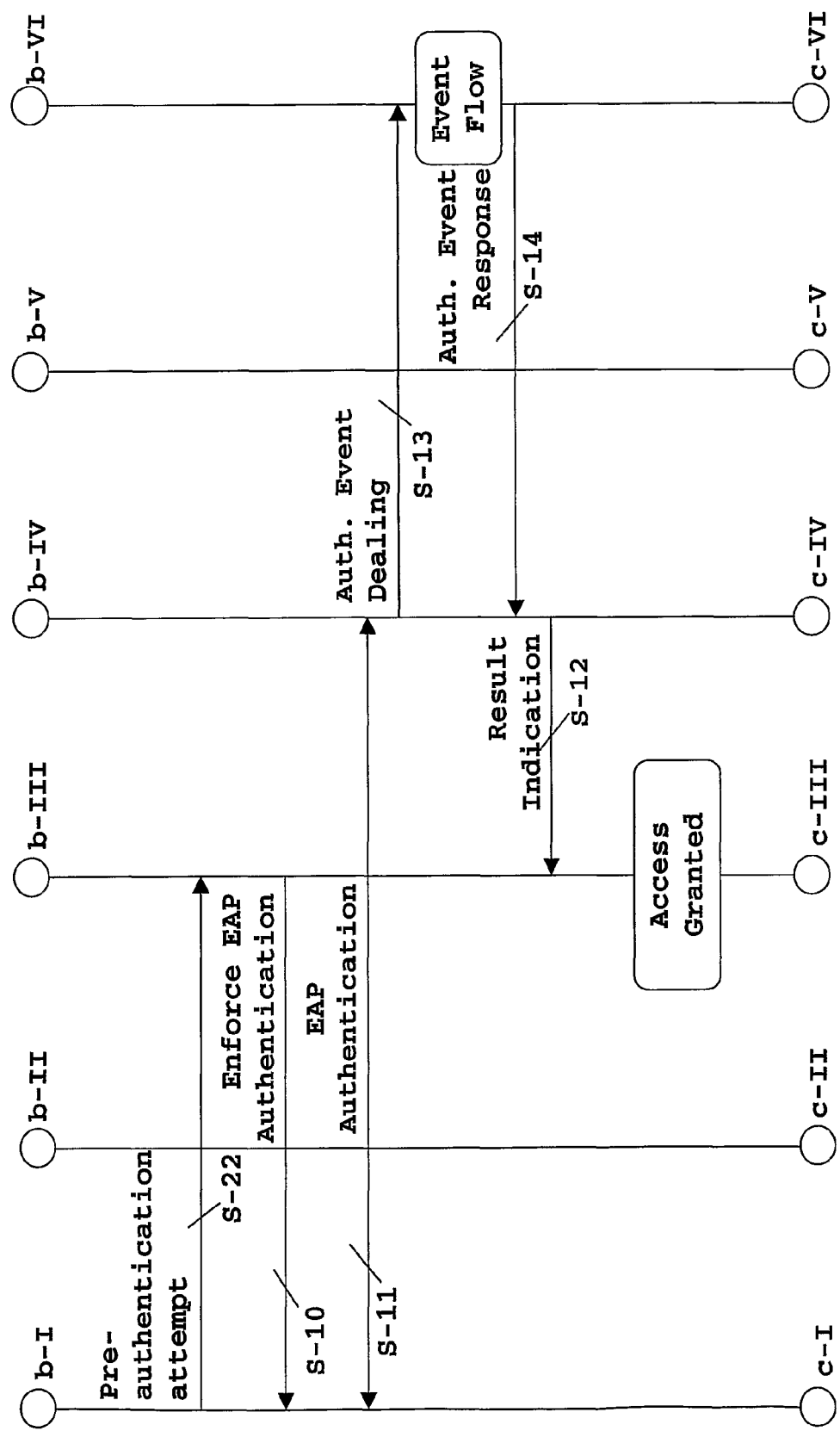
FIG. -7b1-

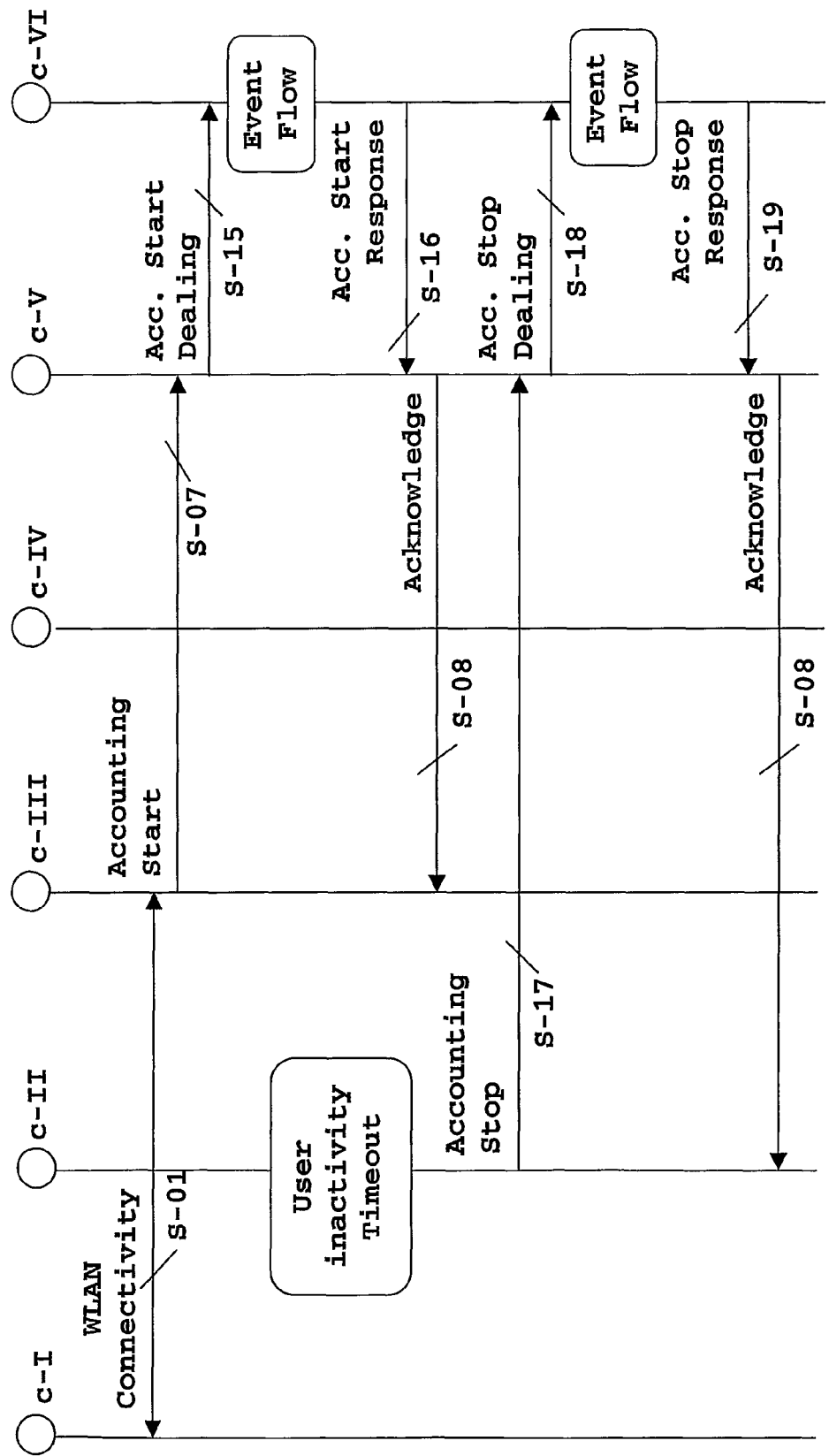
FIG.-7c1-

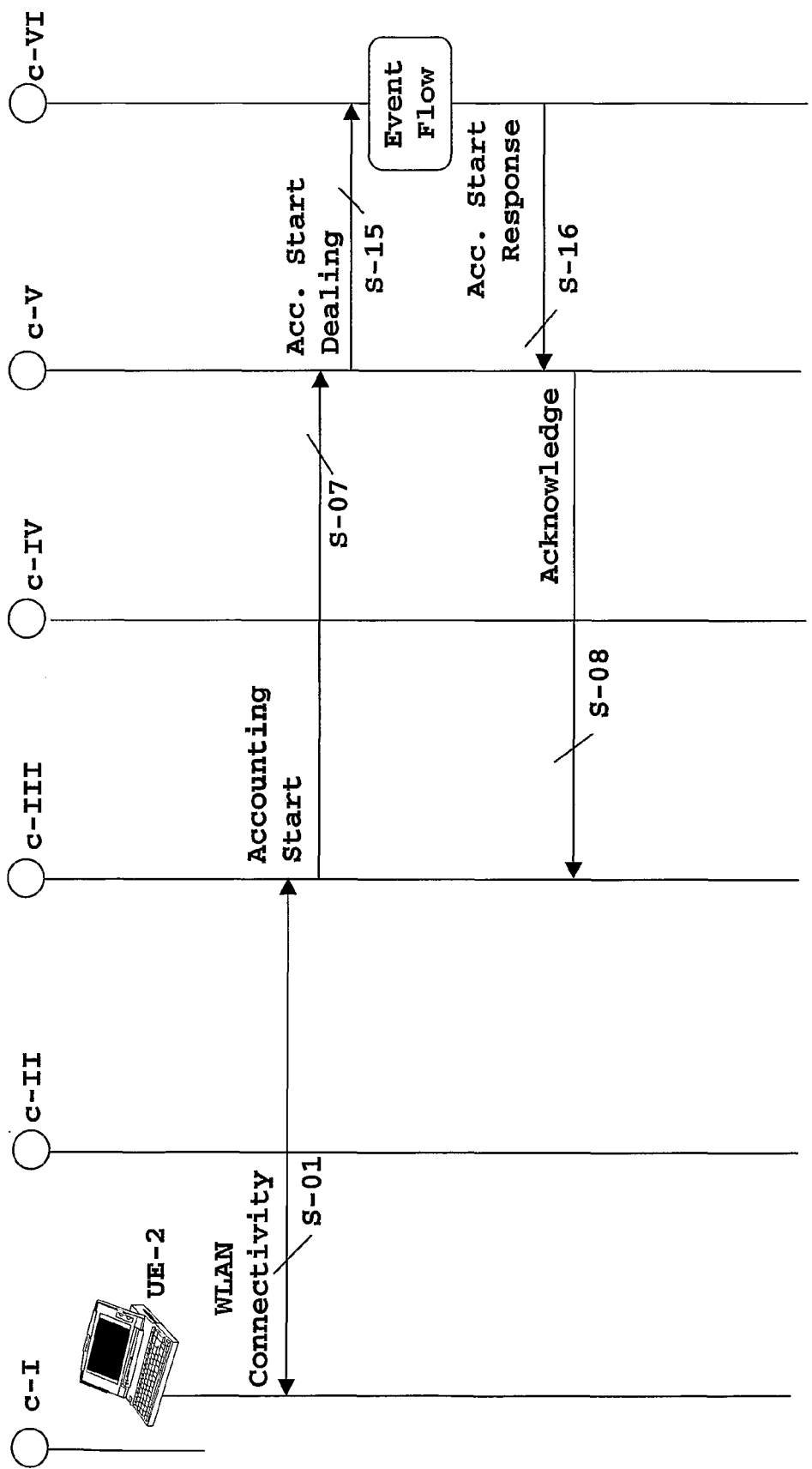
FIG.-7c2-

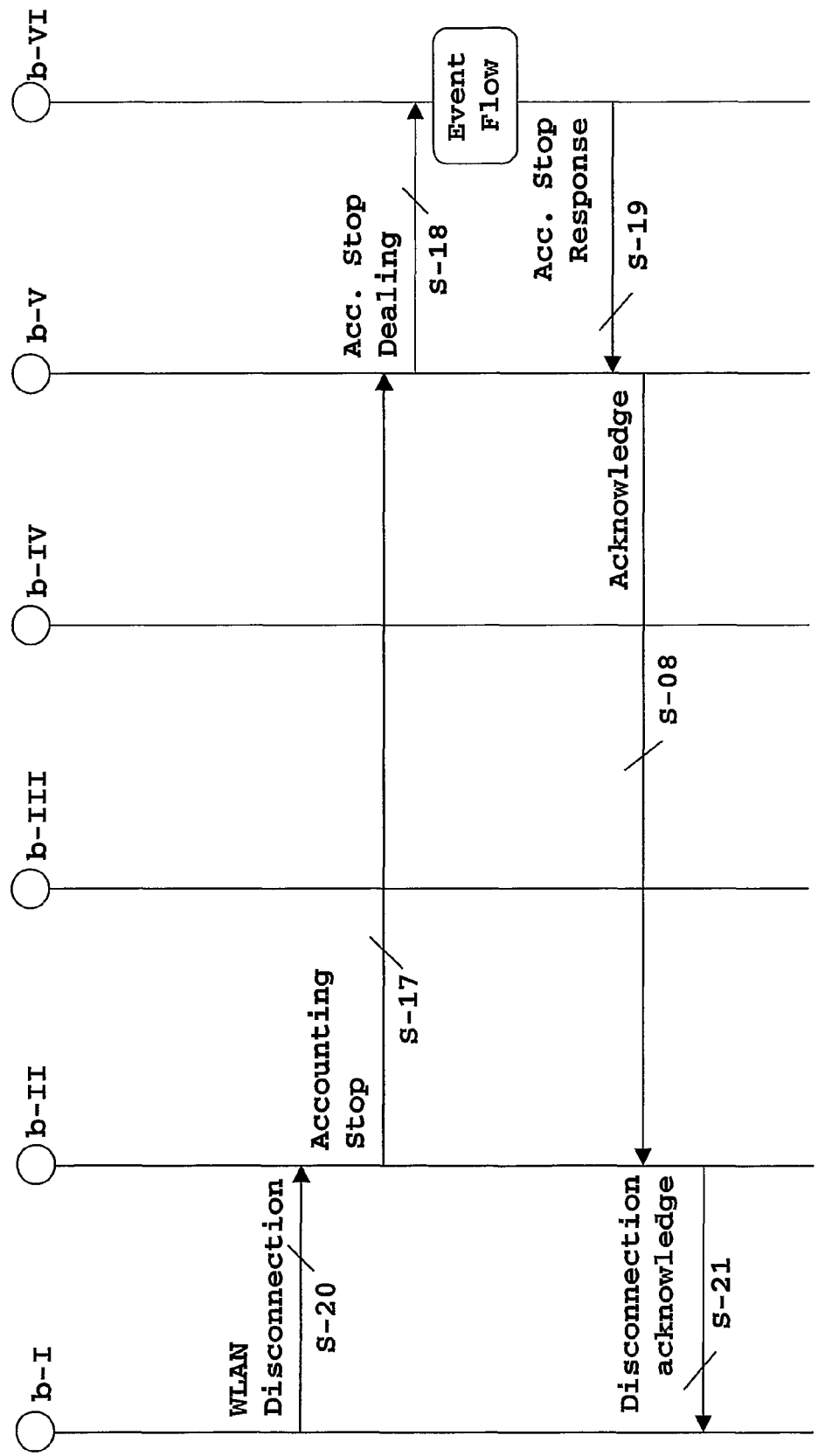
FIG. -7b2-

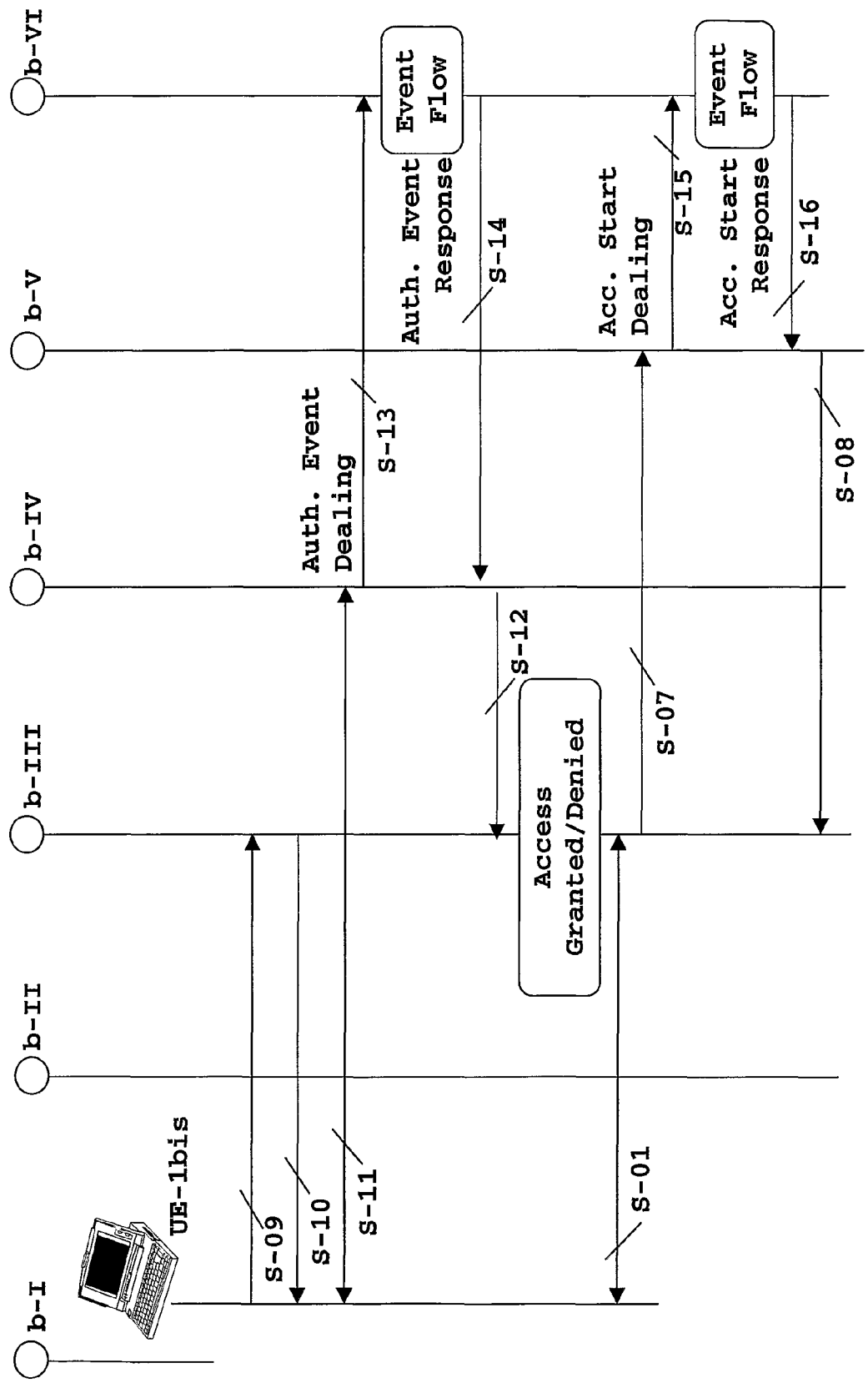
FIG. -7b3-

APPARATUS AND METHOD FOR FRAUD PREVENTION WHEN ACCESSING THROUGH WIRELESS LOCAL AREA NETWORKS

FIELD OF THE INVENTION

The present invention generally relates to means and methods for detecting possible fraud situations that may appear where users are enabled to access a telecommunication network through a number of access points of one or more wireless local area network (WLAN). More specifically, the present invention is particularly applicable in scenarios where a user session is enabled to simultaneously comprise more than one access session established through a number of access points.

BACKGROUND

Traditional mobile and fixed telephony operators are entering the WLAN market in order to provide WLAN access to their subscribers as using WLAN enabled terminals on hot spot areas. In this context, a user has a business relation with his home network operator, such as a telephony operator, which establishes roaming agreements with a number of WLAN Access Providers (hereinafter referred to as WISP's). In particular, a home network operator itself could also deploy WLAN access infrastructure and act as a WISP.

Thus, a quite common scenario is where a user gets WLAN access from different WISP's that have roaming agreements with the user's home network operator. The user's home network operator charges the user for usage of the WLAN access, and pays to corresponding WISP's for providing such WLAN access to its subscribers. Under this scenario, a user's home network carries out an authentication of the user, and receives accounting information from the WISP providing the WLAN access.

Bearing in mind the intermediary position of network operators from a charging perspective, the network operators are presently interested on having further control on those WLAN access sessions that their users might establish. The control of the WLAN access sessions is generally carried out by each WISP and varies from one scenario to another or, in other words, from one WLAN infrastructure version to another.

A typical WLAN infrastructure in a first scenario, the so-called Web-based WLAN access, includes a number of WLAN Access Points (hereinafter AP's), which provide users with WLAN connectivity over a radio interface; and a WLAN Access Server (hereinafter AS), which implements access control and other functions such as, for example, IP address allocation and authorisation enforcement. In this first scenario, each AP provides WLAN access to a user (UE) by letting the user get IP connectivity towards the AS, but the AS blocks any user traffic beyond until the user has been successfully authenticated.

Therefore, as FIG. 1 illustrates, the user equipment (UE-1) includes a Web browser wherein the AS presents (S-04) a login page to the user. The user introduces (S-05) user's credentials into said login page, and the AS sends (S-06) such credentials towards an Authentication Server (Auth-S) in the home network (HOME) for verification. Upon successful authentication, that is, upon credentials verification, the AS grants access to the user, sends (S-07) an indication of accounting start towards an Accounting Server (Acc-S) in the home network (HOME), and initiates an access session.

For the purpose of the present invention, an access session is a repository of data that an entity responsible for access control to an access network maintains in relation to a user of said access network. Typically, this access session is initiated once the user has been authenticated, and is kept alive whilst the user is accessing the access network under control of said entity. Data included in the access session typically includes a user identifier, a unique access session identifier and other parameters such as, for example, a terminal identifier and security keys.

Under this first embodiment, once the access session has been initiated for the user, information about this access session is sent to the home network. Now, provided that the user moves amongst different AP's within the infrastructure of the same WISP, said different AP's are connected to the same AS, and a re-authentication is not necessary. Moreover, the AS is able to keep the same access session that was created when accessing from the first AP.

That is, under this first scenario there is a unique access session for a user even if the user moves from a first to a second AP, both under control of an AS. Thereby, since this approach centralises the access control in the AS, the access session information handled by the AS, and sent from the AS to the home network, is enough to allow the home network to have control of the WLAN access sessions that its subscribers establish as users of the WLAN access network.

A currently developed WLAN infrastructure in a second scenario, which follows the IEEE standard 802.1x, includes a number of WLAN Access Points (AP's) that provide users with WLAN connectivity over a radio interface, as in the previous scenario, and carry out an access control in accordance with said IEEE standard 802.1x; and, optionally, a WLAN Access Server (AS), which implements functions such as, for example, IP address allocation.

Under this second scenario shown in FIG. 2, each AP (AP-1) is responsible for enforcing a user authentication (S-10) based on IETF RFC 2284 "PPP Extensible Authentication Protocol (EAP)". This EAP method is executed end-to-end (S-11) between the user (UE-1) and an Authentication Server (Auth-S) at the user's home network (HOME), and before giving IP connectivity to the user. Once the user authentication is successfully completed, the AP (AP-1) grants access to the user by allowing establishment of the WLAN connection (S-01), sending (S-07) an indication of accounting start towards an Accounting Server (Acc-S) in the home network (HOME), and initiating an access session for the user, as the AS does in the above first scenario. Then, the AP (AP-1) in this second scenario sends access session information to the home network for the latter to have control of the WLAN access sessions that its subscribers establish as users of the WLAN access network. Given that the WLAN Access Server (AS) is optional in this second scenario, the user (UE) might get IP connectivity from the AS, provided that it exists, or from the AP otherwise.

The second scenario described above presents some advantages versus the first one. On the one hand, access control is carried out prior to the establishment of IP connectivity, what is considered more secure. On the other hand, a greater variety of authentication methods can be used within an EAP framework, as exemplary depicted for the second scenario. This variety of authentication methods to use in the second scenario, and which cannot be used in the first one, includes SIM-based authentication methods such as those respectively explained in IETF draft-haverinen-pppext-eap-sim-12 "EAP SIM Authentication", October 2003; and in IETF draft-arkko-pppext-eap-aka-11 "EAP AKA Authentication", October 2003.

However, the second scenario also presents some disadvantages versus the first scenario. For instance, when a user moves between a first and a second AP in the second scenario, a new authentication of the user is required again. This is due to the fact that each AP is arranged to control independent access sessions, thus allowing a user to keep alive different access sessions at a time through different AP's, and the different AP's belonging to a same WISP or to different WISP's.

On the other hand, the support for different access sessions through different AP's, as the second scenario does, may be regarded as a further advantage that gives support for carrying out a pre-authentication. In this respect, a pre-authentication allows that a user, who has gotten access at a given first AP, may carry out an authentication procedure for a second AP, which is different from the first AP, prior to actually moving to said second AP. This way, the handover from one AP to another can be done faster, thus giving a perception of a continuous user session to the user.

An exemplary mixture of the above first and second scenario may be learnt from the international publication WO 2004/029823 wherein WLAN Access Points (AP's) are provided with access control functions in accordance with IEEE 802.1x and including an "Extensible Authentication Protocol (EAP)" application. An access control function, which is active at an AP, requests an access code from any user attempting to access the access network. The user might have obtained such access code from different sources such as the access network operator (WISP), for example. The access code includes a variety of information about usage parameters and business rules that may be used by the AP to control the access by the user. Access codes may be generated by the access control function at the AP, or by a remote Control Server in connection with the AP, and communicated to the access network operator (WISP). In accordance with this publication, the generation of access codes are based on specific business rules and usage parameters of the access network operator for which the access codes are generated.

The Control Server in this international publication is arranged for communicating with a number of AP's, and for directing a new network access operator (WISP) through the process of establishing a new account. The account is set up so that the Control Server can monitor and keep track of activities related to the corresponding AP. That is, accounts and control of activities are carried out on a per AP basis. There is no citation, or even suggestion, throughout this publication on possible impacts or interferences derived from access sessions simultaneously active for a user through different AP's and, even less, when more than one access network operator (WISP) is involved. Moreover, this publication neither considers nor suggests that the authentication of users is carried out by a home network operator holding a subscription for the users and involved as a charging intermediate entity.

However, the simultaneous existence of several access sessions for a user through different AP's, and the reasons why the several access sessions were initiated, lead to consider different situations, wherein some of them are perfectly permissible from home network operators perspective whereas others might be indicative of fraudulent activities. Indeed, each AP initiating an access session for a user might send information about this access session to the home network, but the home network cannot distinguish whether several access sessions for a user derive from a permissible flow of actions carried out by the user. In this respect, different access sessions and flow of actions may result from re-authentication, pre-authentication, handover, or simply simultaneous accesses.

Generally speaking, fraud occurs when non-authorized users are using the credentials of a legitimate user. This may occur because such credentials have been stolen or because the legitimate user commits fraud towards the home network operator by sharing the credentials with other users.

A first illustrative example deals with prepaid users that make use of a username-password authentication and have a flat rate charging. In this case, a fraud situation occurs if several users make use of the same username and password for accessing the network. For instance, as FIG. 3 shows, a first user (UE-1) performs an authentication procedure (S-09, S-10, S-11) with a first WLAN Access Point (AP-1) and gets a granted access and WLAN connectivity (S-01) through the first WLAN Access Point. Then, either the first user (UE-1) gives his user identity and password to a second user (UE-2), or the second user (UE-2) spoofs the user identity and password of the first user (UE-1), both ways can be considered a fraud. This second user (UE-2) accesses the network from a different terminal and contacts a different WLAN Access Point (AP-2). From the network point of view, both first and second users (UE-1, UE-2) are the same user. For both cases the access is granted.

A second illustrative example deals with users making use of a SIM for having a SIM-card based authentication. Fraud can occur if there is a SIM card cloning, or if several subscribers make use of the same SIM card by connecting the SIM card via a dongle, and the dongle being moved between users' terminals.

Nevertheless, the situation presented above is not always a fraud situation. An operator might be interested in allowing certain subscribers to keep more than one session in a controlled manner, for example, gold subscribers might be allowed to access the network from different terminals, so that distinguishing fraud situations from other acceptable situations is an important issue for the operators, and thus addressed by the present invention.

Currently existing techniques between an access network, such as WLAN, and a home network, such as mobile network, do not allow the detection of these fraud situations since an Accounting Server is the entity receiving accounting information in the home network, and thus receiving information about the access sessions for a user, and the Accounting Server has no means to distinguish whether several access sessions for a user derive from a permissible flow of actions carried out by the user or not. For example, a home network operator cannot take for granted that the reception of a new indication of accounting start implies a new access session for a user, since it may be rather due to a handover procedure between two different AP's.

On the other hand, the centralized solution offered by the Control Server in the above international publication is rather directed to facilitate a local access control on a per AP basis, and under each WLAN operator premises. This prior art solution does not teach any mechanism whereby the fraud situations above may be distinguished from permissible situations from a home network operator perspective.

An object of the present invention is the provision of a mechanism to allow detection of possible fraud situations when several access sessions are simultaneously active for a user through different Access Points (AP's).

Furthermore, the concept of access codes described in the above international publication, including generation and handling, is not a standard issue supported by currently existing AP's following the IEEE 802.1x in the above second scenario. Any further development over the teaching in the above international publication to include a mechanism for fraud detection when several access sessions are active for a user would imply the modification of currently existing AP's.

Thereby, it is a further object aiming the present invention that the mechanism to allow detection of possible fraud situations does not produce any impact on the existing Access Points operating in accordance with the above second scenario.

SUMMARY OF THE INVENTION

The above objects are accomplished in accordance with the present invention by the provision of an apparatus in accordance to claim 1, named Session Aggregator device in the instant specification, and a method in accordance with claim 13.

The Session Aggregator device is suitable for controlling a plurality of access sessions established by a user who accesses a wireless local area network (WLAN) through a number of Access Points, wherein the user is subscriber of a first operator network and the Access Points belong to second operator networks. In particular, the first operator network and the second operator networks may be operated by a same operator or by different operators. The Access Points carry out access control procedures whereby the user is authenticated by the first operator network. A Session Aggregator device in accordance with the invention has:

a) means for receiving information of authentication events for the user accessing a given Access Point with a given user equipment; and
b) means for receiving information of accounting events that includes information related to an access session established for the user at the given Access Point with the given user equipment;
c) authorization means arranged to make a decision on whether the user is allowed to access the given Access Point as receiving information of authentication events, and based on other access sessions that the user has established; and
d) processing means arranged to determine whether present course of actions corresponds to a permissible flow, or accounting events for the user having an access session at the given Access Point with the given user equipment.

In an embodiment of the invention, this authorization means includes means for creating an Access Authentication Record for the user, once an indication of an authentication event is received indicating that the user has been authenticated through a given Access Point. The Access Authentication Record comprises: a user identifier identifying the user addressed in the indication; an identifier of the user equipment received in the indication; and an identifier of the Access Point that enforced such authentication.

In operation, a first Access Authentication Record is created in the Session Aggregator device when the user is authenticated through a first Access Point where the user accesses with its user equipment, and a second Access Authentication Record is created when the user is pre-authenticated through a second Access Point. Moreover, since a user may be allowed to access though more than one Access Point with more than one user equipment, the Session Aggregator device is also arranged in such a manner that a first Access Authentication Record is created when the user is authenticated through a first Access Point with a first user equipment, and a second Access Authentication Record is created when the user is authenticated through a second Access Point with a second user equipment, inasmuch as the user is allowed to have more than one access session simultaneously active.

The Session Aggregator device may be enhanced when the Access Authentication Record also comprises an indication about the type of authentication performed for the user, and a time measurement indicative of the time when the Access Authentication Record was created. The time measurement may be consulted to determine whether a current flow of actions is considered a permissible or a fraudulent activity.

On the other hand, the processing means in the Session Aggregator device, provided for in accordance with the invention, includes means for creating an Aggregated Session Record for the user once the user has established an access session through a given Access Point. This Aggregated Session Record comprises: a user identifier identifying the user addressed in the indication; an identifier of the user equipment received in the indication; an identifier of the Access Point where the session has been established; and a list of Access Authentication Records associated to this particular Aggregated Session Record.

In operation, an Aggregated Session Record in the Session Aggregator device is updated during a handover procedure to replace a first identifier of a first Access Point, where the user had accessed with the user equipment, by a second identifier of a second Access Point where the user has established an access session after having a successful pre-authentication. As for the above Access Authentication Record, and given that a user may be allowed to access through different Access Points with different user equipments, the Session Aggregator device is arranged so that a first Aggregated Session Record is created when the user has established a first access session through a first Access Point with a first user equipment, and a second Aggregated Session Record is created when the user has established a second access session through a second Access Point with a second user equipment, inasmuch as the user is allowed to have more than one access session simultaneously active.

The Session Aggregator device receives indications of accounting events such as an accounting stop indication. Thus, as receiving an indication of accounting stop, the Aggregated Session Record corresponding to the access session that the user had established with the user equipment through the Access Point is removed.

The Session Aggregator device (SAD) may be also enhanced when the Aggregated Session Record also comprises a time measurement indicative of the time when the Aggregated Session Record was created.

Moreover, the Session Aggregator device may also comprise a global mapping module for correlating an authentication identity and an accounting identity, the authentication identity being received as the user identifier identifying the user in each indication of authentication event, and the accounting identity being received as the user identifier identifying the user in each indication of accounting event.

The present invention also provides for a method for controlling a plurality of access sessions established by a user who accesses a wireless local area network (WLAN) through a number of Access Points, wherein the user is subscriber of a first operator network and the Access Points, which are operated by second operator networks, carry out access control procedures. The method in accordance with the invention comprises the steps of:

(a) enforcing a user authentication at an Access Point where the user has established a layer 2 connection with a user equipment;

(b) carrying out a user authentication between the user equipment and an Authentication Server at the first operator network;
(c) establishing an access session that grants access to the user through the Access Point upon successful user authentication;
(d) indicating an accounting event towards an Accounting Server at the first operator network upon the user gaining connectivity on the access session;
(e) making an authorization decision based on previous access sessions already established for the user with the given user equipment upon indication of an authentication event received at a centralized entity; and
(f) determining whether a present course of actions corresponds to a permissible flow, or to a possible fraudulent flow, for the user having the access session at the given Access Point with the given user equipment, upon indication of the accounting event received at a centralized entity.

In accordance with a nowadays-preferred embodiment, the step e) of making an authorization decision in this method, preferably includes the steps of:
  checking whether the user with a given user identifier is new from an event decision point of view;
  checking for a non-new user whether a given identifier of the user equipment is new; and
  checking for a non-new user with a new identifier of user equipment whether several access sessions are allowed to be simultaneously active for the user.

Following this method, those checking steps resulting on determining a non-new user with a new identifier of user equipment, and several access sessions not allowed to be simultaneously active for the user, lead to detect a possible fraudulent activity. However, when the above checking steps result on a non-new user with a non-new identifier of the user equipment, the method further comprises a step of checking whether a given identifier of the Access Point is new, what is understood as an authentication or pre-authentication for the user, and thus a permissible activity.

Aligned with a corresponding embodiment for the above apparatus, and for the sake of coherence and unity, the method also comprises a step of creating a first Access Authentication Record for the user once a positive authorization decision has been made for the user to access through a first Access Point with a user equipment. Moreover, the method further comprises a step of creating a second Access Authentication Record for the user when the user is authenticated or pre-authenticated through a second Access Point. These Access Authentication Records comprising: a user identifier identifying the user addressed in the indication of an authentication event; an identifier of the user equipment received in said indication; and an identifier of the Access Point that enforced the authentication.

In accordance with a nowadays-preferred embodiment, the step f) of determining the present course of actions in this method includes the steps of:
  checking whether a successful authentication took place for the user with a given user identifier, with a given identifier of user equipment, and through an Access Point identified by a given identifier; and
  checking whether any previous access session for this successful authentication had been already indicated.

Following this method, those checking steps resulting on determining that no successful authentication has taken place for the user with a given user identifier, with a given identifier of the user equipment, and through a given Access Point identified by a given identifier, lead to detect a possible fraudulent activity. However, when the above checking steps result on determining that a successful authentication has already taken place for the user and a previous access session for this successful authentication had been already indicated, the method determines that there is a handover procedure on course.

In accordance with a nowadays-preferred embodiment, the method further includes a step of creating an Aggregated Session Record for the user, as determining that a positive authorization has been already made for the user to access the given Access Point, and no access session had been indicated yet, other than the current one, for this positive authorization. This Aggregated Session Record comprises: a user identifier identifying the user addressed in the indication of an accounting event; an identifier of the user equipment received in said indication; an identifier of the Access Point where the session has been established; and a list of Access Authentication Records associated to this particular Aggregated Session Record.

The introduction of Aggregated Session Records provides additional advantages to the method. Thus, the method further comprises a step of updating an Aggregated Session Record as detecting a handover between a first Access Point and a second Access Point, the updating carried out by replacing an identifier of the first Access Point with an identifier of the second Access Point, and by removing from the list the Access Authentication Record corresponding to the first Access Point.

The method further comprises a step of disconnecting a user from a given Access Point, the disconnection indicated with an accounting event (S-17) towards the centralized entity. In an embodiment using Access Authentication Records and Aggregated Session Records, this step further includes the steps of: removing corresponding Access Authentication Record; updating associated Aggregated Session Record to remove from the list the Access Authentication Record; and removing Aggregated Session Record when the list is empty.

BRIEF DESCRIPTION OF DRAWINGS

The features, objects and advantages of the invention will become apparent by reading this description in conjunction with the accompanying drawings, in which:

FIG. 1 shows a prior art WLAN infrastructure in a first scenario, a so-called Web-based WLAN access.

FIG. 2 shows a prior art WLAN infrastructure in a second scenario that follows the IEEE standard 802.1x.

FIG. 3 illustrates a flow sequence describing a currently existing problem that cannot be solved with the existing techniques.

FIGS. 4 and 5 show two alternative architectures provided for in the present invention.

FIGS. 6a and 6b presents a basic flow chart of an event flow machine provided for making authorization decisions and for determining whether present course of actions correspond to a permissible or a fraudulent activity.

FIG. 7a illustrates a basic sequence diagram of a first partial view of a first course of actions where a user is authenticated and authorized to access a first Access Point, and the user accessing the first Access Point.

FIG. 7b1 illustrates a basic sequence diagram of a second partial view that follows FIG. 7a in the first course of actions where the user is pre-authenticated and authorized to access a second Access Point.

FIG. 7c1 illustrates a basic sequence diagram of a third partial view that follows FIGS. 7a and 7b1 in the first course of actions where the user carries out a handover between the first and the second Access Points.

FIG. 7c2 illustrates a basic sequence diagram of a third partial view that follows FIGS. 7a and 7b1 in a second course of actions whereby a second user spoofs credentials of the first user to access the second Access Point where the first user had been pre-authenticated.

FIG. 7b2 illustrates a basic sequence diagram of a second partial view that follows FIG. 7a in a third course of actions where the user is disconnected from an access gained through the first Access Point.

FIG. 7b3 illustrates a basic sequence diagram of a second partial view that follows FIG. 7a in a fourth course of actions where the user with a second user equipment is authenticated through a second Access Point and, provided that the user is authorized to have several access sessions simultaneously, the user can access the second Access Point.

DETAILED DESCRIPTION OF PREFERRED EMBODIMENTS

The following describes some preferred embodiments for carrying out an effective detection of possible fraud situations when several access sessions are simultaneously active for a user through different access points, and for distinguishing these possible fraud situations from other permissible situations, both presenting apparently similar characteristics though derived from different flows of actions.

Therefore, the present invention provides for a number of steps that are carried out to be aware of the actions occurred. On the one hand, accounting messages received in the Accounting Server (Acc-S) are used to indicate whether an access session is created (Accounting Start), or is still alive (Accounting Interim), or has been terminated (Accounting Stop) and corresponding data thus deleted.

On the other hand, handling of accounting messages is not sufficient in order to make authorisation decisions based on the number of already existing access sessions for a user. These authorisation decisions are made either during the authentication process itself, or immediately afterwards, so that once the user has been authenticated at an Authentication Server (Auth-S) of the home network (HOME), a control check can be carried out to determine whether a new access session is allowed or not, depending on the existence of other access sessions for said user, and before sending a successful response to an entity of the access network (WLAN) where the user is accessing through. That is, even if the authentication is successful, the answer to an access request received from the access network (WLAN) could be negative, especially if a possible fraud situation has been determined during the control check.

The control check requires means for collecting information of events related to both procedures, namely authentication and accounting procedures, and the usage of a centralized device to receive messages initially addressing both corresponding entities, Authentication Server (Auth-S) and Accounting Server (Acc-S) respectively. This centralized device, which is named Session Aggregator device (SAD) in the instant specification, has the means for collecting information of authentication and accounting events, and is thus in charge of managing such control check.

At present, "RADIUS" and "Diameter" protocols are the most commonly used for communicating a Network Access Server (generally known as NAS), which in particular might be a WLAN Access Point (AP), with the Authentication Server (Auth-S) and the Accounting Server (Acc-S).

In accordance with a first embodiment of the invention illustrated in FIG. 4, this communication could be achieved by having the Session Aggregator device (SAD) interposed between the WLAN Access Point (AP) and both Authentication Server (Auth-S) and Accounting Server (Acc-S), and thus acting as a RADIUS proxy or as a Diameter proxy for both authentication and accounting messages. In accordance with an alternative second embodiment illustrated in FIG. 5, the Authentication Server (Auth-S) and Accounting Server (Acc-S), both in communication with the WLAN Access Point (AP), forward the relevant authentication and accounting messages to the Session Aggregator device (SAD).

The Session Aggregator device (SAD) can then analyse session information received in accounting messages, such as a user identifier and an identifier of the user terminal, in order to determine whether different access sessions correspond to the same or different user sessions. In this respect and for the purpose of the present invention, a user session is a progression of events related to the usage of one or more applications through a given access network (WLAN) regardless of the entry point to said access network or, in other words, a user session may comprise a plurality of access sessions that a user has established through a number of access points (AP's) of a given access network.

Moreover, the Session Aggregator device (SAD) can handle session information about several user sessions that a user might have at different access networks, such as a number of WLAN access networks and a GSM Packet Radio system (GPRS) network, each user session comprising a plurality of access sessions that the user has established through a number of Network Access Servers (NAS), which in particular might be Access Points (AP's), of a given access network. This session information, once processed, can be sent to a fraud management system, which in turn may take actions such as to raise alarms, or to tear down suspicious sessions.

The Session Aggregator device (SAD) is responsible for the process of making authorization decisions, acting either as a front-end entity interposed between a Network Access Server (AP) and the Authentication Server (Auth-S) (A1, A3) and the Accounting Server (Acc-S) (A2, A4) in accordance with the first embodiment illustrated in FIG. 4, or as a back-end entity where authentication and accounting messages are forwarded (A5, A6) from the Authentication Server (Auth-S) and Accounting Server (Acc-S) in accordance with the second embodiment illustrated in FIG. 5.

A basic process of making authorization decisions and control checks is further described in respect of the above second embodiment shown in FIG. 5, and a WLAN network being the access network. Therefore, the Session Aggregator device (SAD) is provided with an event flow machine illustrated by combination of FIGS. 6a and 6b. This event flow machine is operable upon reception of an indication showing a successful authentication of a user, and an indication showing whether accounting starts, continues, or ends for a user with a given access session.

Even though different protocols may be suitable for use as respective protocols between the Session Aggregator device (SAD) and the Authentication Server (Auth-S) and Accounting Server (Acc-S), for the sake of simplicity, the process of making authorization decisions and control checks is explained with reference to a RADIUS protocol. In this respect, several flows may turn up depending on different activities that users might carry out. Some of these possible flows are described in an illustrative and non-restrictive manner with reference to a first combination of FIG. 7a, 7b1 and 7c1; with reference to a second combination of FIG. 7a, 7b1 and 7c2; with reference to a third combination of FIG. 7a, and 7b2; and with reference to a fourth combination of FIGS. 7a and 7b3.

A first flow of actions starts as illustrated in FIG. 7a when a user (UE-1), who is a subscriber of a home network (HOME), has initially accessed (S-09) a WLAN Access Point (AP-1). The WLAN Access Point (AP-1) enforces (S-10) the user authentication by redirecting the user to an Authentication Server (Auth-S) at the home operator network (HOME). The Authentication Server (Auth-S) makes use of a suitable authentication procedure, as likely indicated in the user profile, to authenticate the user (S-11). In accordance with the invention, and provided that the authentication procedure is successful, the Session Aggregator device (SAD) is informed (S-13). The Session Aggregator device (SAD) processes the information with an event flow machine (Event Flow) to decide if the user is allowed to get access taking into account other access sessions that the user might have already established.

In this particular case, the assumption is that the user is a new user attempting a first access, and the event flow machine receiving an indication of successful user authentication, the Authentication Event Dealing (S-13) shown in FIG. 6a and FIG. 7a, triggers the creation of an Access Authentication Record (AAR) for the user at the Session Aggregator device (SAD), what is a positive result in this case. The Access Point (AP-1) is informed (S-14, S-12) about the outcome of this decision, preferably through the Authentication Server (Auth-S) under this second embodiment, though it might be directly informed from the Session Aggregator device (SAD) if a suitable interface is provided to this end, like A1 in FIG. 4, and corresponding addressing data are received via the Authentication Server (Auth-S), like A3 in FIG. 4. Provided that both authentication procedure and authorization decision have a positive result, the access is granted at the Access Point (AP-1).

More specifically, an Access Authentication Record (AAR) is created for a user once the user is authenticated through a particular Access Point (AP-1), and irrespective of being due to an authentication or to a pre-authentication. The Access Authentication Record (AAR) demonstrates that a successful authentication has occurred for the user and, at the same time, keeps information about procedural events associated with the authentication procedure such as, for example, an identifier of the user terminal, a user identifier for authentication purposes, an identifier of the Access Point (AP-1) requesting the access, time of the authentication, and authentication type. Since several access sessions may be established by a user through different Access Points, and given that each Access Point requests an authentication of the user from the home operator network where the user is a subscriber, there can be several Access Authentication Records (AAR's) per subscriber.

At this stage, the user (UE-1) gets WLAN connectivity (S-01) through the Access Point (AP-1) wherein an access session is created for the user, and communicated towards an Accounting Server (Acc-S) with an indication of accounting start (S-07). The Session Aggregator device (SAD) is also informed (S-15) about the accounting event and processes the received information with the event flow machine (Event Flow) to determine whether or not the present course of actions corresponds to a permissible flow. In the present case, as FIG. 6a presents, an existing Access Authentication Record (AAR) is found for the user indicating that the user had been already authenticated and, since no previous access session had been established, apart from the one presently indicated with the indication of accounting start, an Aggregated Session Record (ASR) is created to demonstrate that a first access session is established by the user through the given Access Point (AP-1).

This first flow of actions may go ahead with a further step illustrated in FIG. 7b1, wherein a pre-authentication procedure is carried out through a second Access Point (AP-2). The choice of the second Access Point (AP-2) might be due to different reasons such as coverage area or reception quality, for example.

Therefore, the user equipment (UE-1) initiates a so-called pre-authentication attempt (S-22) to the second Access Point (AP-2), and the latter enforces (S-10) the user authentication, which the user carries out (S-1i) with an Authentication Server (Auth-S) of the home operator network. In accordance with the invention, the Session Aggregator device (SAD) is informed (S-13) about it, and processes the information with the event flow machine (Event Flow) as done for a normal authentication. In this case, and following the flow chart of FIG. 6a, the event flow machine checks the existing Access Authentication Records (AAR) and finds that the user is not new; the user equipment identity, for example a MAC address, is not new; and the Access Point (AP-2) where the user accesses through is different than the one stored in the previous Access Authentication Record (AAR) for the user. The event flow machine in the Session Aggregator device (SAD) decides with this information the creation of a second Access Authentication Record (AAR) and returns (S-14, S-12) a positive result towards the second Access Point (AP-2) where the user has been pre-authenticated, preferably through the Authentication Server (Auth-S). Now, the second Access Point (AP-2) marks the access granted for the user though the user has not yet gained WLAN connectivity.

At this stage different actions might occur following the above pre-authentication procedure, different actions that the present invention can distinguish thanks to the Session Aggregator device (SAD) and means included therein.

A first exemplary action shown in FIG. 7c1 completes the first flow of actions commented above when following the sequence in FIG. 7a, 7b1 and 7c1, and illustrates a handover procedure that can be carried out after having completed the pre-authentication procedure. The handover starts by the user equipment (UE-1) gaining WLAN connectivity (S-01) with the second Access Point (AP-2) where the access had been already granted. The second Access Point (AP-2), as detecting user connectivity, creates an access session for the user, and informs about it with an indication of accounting start (S-07) towards the Accounting Server (Acc-S). In accordance with the invention, the Session Aggregator device (SAD) is also informed (S-15) about the event, and processes the received information with the event flow machine (Event Flow). The Session Aggregator device (SAD) detects for that user a first Access Authentication Record (AAR) created when the user was firstly authenticated through the first Access Point (AP-1), a first Aggregated Session Record (ASR) created when the user had established a first access session with the first Access Point (AP-1), and a second Access Authentication Record (AAR) created when the user was pre-authenticated through the second Access Point (AP-2) prior to the current handover.

In this case, and following the flow chart of FIG. 6a, the event flow machine dealing with an accounting start indication encounters Access Authentication Records (AAR's) for the user as well as an associated Aggregated Session Record (ASR) and determines a handover is on course. Soon or later, as shown in FIG. 7c1, the first Access Point (AP-1) detects that said user (UE-1) is not longer active, likely with help of an inactivity timeout for the user, and the first Access Point (AP-1) sends (S-17) an indication of accounting stop for the user towards the Accounting Server (Acc-S). As for other authentication and accounting events, the Session Aggregator device (SAD) also receives this information and processes it with the portion of the event flow machine shown in FIG. 6b. In this respect, the latter accounting stop triggered from the first Access Point (AP-1) and the previous identification of handover might occur more or less concurrently, and the event flow machine of FIGS. 6a and 6b includes a first (T0) and a second timer (T1) to appropriately distinguish fraudulent from permissible situations.

In the present case, as shown in FIG. 7c1, the handover is determined firstly and, according to the flow chart shown in FIG. 6b, the Aggregated Session Record (ASR) is updated to replace the identifier of the first Access Point (AP-1) by the identifier of the second Access Point (AP-2). Then, when the accounting stop event (S-18) is dealt with, the first Access Authentication Record (AAR) associated to the first Access Point (AP-1) is removed. Eventually, the handover procedure in FIG. 7c1 is completed by acknowledging such accounting event back to the first Access Point (AP-1).

A second exemplary action shown in FIG. 7c2 completes the second flow of actions commented above when following the sequence in FIG. 7a, 7b1 and 7c2, and illustrates a fraudulent activity that might occur after having completed the pre-authentication procedure shown in FIG. 7b1. In short, the course of actions carried out as following the sequences in FIG. 7a and FIG. 7b1, and before starting the sequence in FIG. 7c2, can be summarized as: a first user (UE-1) has gained WLAN connectivity in a first Access Point (AP-1); a first Access Authentication Record (AAR) and a first Aggregated Session Record (ASR) have been created at the Session Aggregator device (SAD); a pre-authentication of the first user has been carried out through a second Access Point (AP-2); and, as a result of this pre-authentication, a second Access Authentication Record (AAR) has been also created at the Session Aggregator device (SAD).

At this time, a fraudulent activity may be carried out by an attacker user (UE-2) who steals the security keys of the first user (UE-1), and makes use of an own terminal (UE-2) with a different terminal identifier, that is, with a MAC address different from the one used by the first user (UE-1). As FIG. 7c2 illustrates, the attacker user (UE-2) may thus gain WLAN connectivity (S-01) with the second Access Point (AP-2) where the first user (UE-1) had been pre-authenticated. The second Access Point (AP-2) creates an access session for the user, and informs about it with an indication of accounting start (S-07) towards the Accounting Server (Acc-S). As for previous cases and in accordance with the invention, the Session Aggregator device (SAD) is also informed (S-15) about the event, and processes the received information with the event flow machine (Event Flow) shown in FIG. 6a. As a matter of fact, upon dealing with an accounting start at the event flow machine, no Access Authentication Record (AAR) is found for the user with the received MAC address, which corresponds to the attacker user (UE-2), since the first and second Access Authentication Records (AAR's) existing at the Session Aggregator device (SAD) both include the MAC address of the first user (UE-1). Thus, a possible fraud is detected, and may be communicated either back (S-16, S-08) to the second Access Point (AP-2) in order to refuse the access for the attacker user (UE-2), or to an external fraud management system under home operator premises, which is not shown in any drawing.

A variant of the fraudulent activity described above with the second exemplary action shown in FIG. 7c2 is when the attacker user (UE-2) has not only stolen or spoofed the security keys of the first user (UE-1) but also the terminal identifier, a MAC address, of said first user (UE-1). Under this assumption, the second Access Point (AP-2) where the first user (UE-1) was pre-authenticated creates an access session for the user, and informs about it with an indication of accounting start (S-07) towards the Accounting Server (Acc-S) as illustrated in FIG. 7c2 and previously commented. Then, the Session Aggregator device (SAD) receiving (S-15) and processing such information with the event flow machine (Event Flow) encounters the second Access Authentication Record (AAR) created when pre-authenticating the first user (UE-1), and also encounters the first Aggregated Session Record (ASR) created when the first user gained WLAN connectivity with the first Access Point (AP-1). Following the flow shown in FIG. 6a, the event flow machine (Event Flow) determines that there is a handover on course, as anyone may determine by comparing the course of actions for the handover procedure also described above. However, this case is not a handover and a timeout (T0) of a timer set when determining handover expires before receiving a corresponding indication of accounting stop, what leads the event flow machine to determine a possible fraud situation also for this case.

A third exemplary action shown in FIG. 7b2 completes the third flow of actions commented above when following the sequence in FIGS. 7a and 7b2, and illustrates the steps carried out by different entities when the first user (UE-1), who had been authenticated and had gained WLAN connectivity following the sequence in FIG. 7a, initiates a WLAN disconnection (S-20). As FIG. 7b2 illustrates, the WLAN disconnection (S-20) is received at the first Access Point (AP-1) serving the user (UE-1), and the first Access Point sends (S-17) an indication of accounting stop to the Accounting Server (Acc-S). This indication is also received (S-15) at the Session Aggregator device (SAD), the latter processing such information with the event flow machine (Event Flow) that encounters the first Access Authentication Record (AAR) created when authenticating the first user (UE-1), and also encounters the associated first Aggregated Session Record (ASR) created when the first user gained WLAN connectivity with the first Access Point (AP-1). The Session Aggregator device (SAD) dealing with such accounting stop removes the associated first Aggregated Session Record (ASR) and, as a part of this routine, it also removes the associated Access Authentication Records (AAR) that in the present case is only said first Access Authentication Record (AAR). A similar behaviour may be obtained if the user does not explicitly disconnects from the first Access Point (AP-1) wherein a user inactivity timeout expires, what is understood at the first Access Point (AP-1) as an implicit disconnection producing the same effect as the explicit disconnection.

A fourth exemplary action shown in FIG. 7b3 completes the fourth flow of actions commented above when following the sequence in FIGS. 7a and 7b3, and illustrates the procedure followed to grant or deny access to users with more than user equipment simultaneously. Thus, once a user with a first user equipment (UE-1) has been authenticated and has gained WLAN connectivity with a first Access Point (AP-1) as shown in FIG. 7a, there are a first Access Authentication Record (AAR) and a first Aggregated Session Record (ASR) created for the user in the Session Aggregator device (SAD). The sequence in FIG. 7b3 starts when the same user with a second user equipment (UE-1bis) tries to access (S-09) a second Access Point (AP-2), which may be under the same operator (WISP) premises as the first Access Point (AP-1) is, or under another operator premises not shown in any drawing. The second Access Point (AP-2), then, enforces (S-b0) the user authentication (S-11) towards an Authentication Server (Auth-S) in the home operator network holding a subscription for the user. Upon successful user authentication, the Session Aggregator device (SAD) processes the received information with the event flow machine (Event Flow). As dealing with the authentication event under FIG. 6a, the event flow machine encounters that the user is not new, and the identifier of the user equipment (UE-1bis) is different from the one used in a previous access, that is, the received MAC address is different from the previous one. The outcome of the process at this stage depends on whether more than one access session is allowed to be simultaneously active for the user, what can be determined based on subscription options under the home operator perspective. Provided that the user is allowed to gain access through different Access Points (AP-1, AP-2) with different user equipments (UE-1, UE-1bis) the Session Aggregator device (SAD) creates a second Access Authentication Record (AAR) and sends a successful acknowledge back (S-14, S-12) to the second Access Point (AP-2) wherein the access is granted. Otherwise, the Session Aggregator device (SAD) assumes that the second user equipment (UE-1bis) is used by an attacker user who has stolen the user keys or credentials for attempting to access the network, what is understood as a possible fraud, and returned with the acknowledge (S-14, S-12) towards the second Access Point (AP-2) for the latter to deny access to the user. The Session Aggregator device (SAD) may as well inform an external fraud management system in order to take proper actions.

In case the access has been granted, the user can gain (S-01) WLAN connectivity with the second user equipment (UE-1bis) through the second Access Point (AP-2), the latter sending (S-07) an indication of accounting start towards the Accounting Server (Acc-S) and, as in previous cases, the Session Aggregator device (SAD) receiving (S-15) and processing such information with the event flow machine (Event Flow). The Session Aggregator device (SAD), as dealing with the accounting start, follows the process sequence shown in FIG. 6a, and encounters an existing Access Authentication Record (AAR) for the user, namely the second Access Authentication Record (AAR) created during authentication with the second user equipment (UE-1bis). Given that no associated Aggregated Session Record (ASR) is found for said second Access Authentication Record (AAR), the Session Aggregator device (SAD) creates a second Aggregated Session Record (ASR) for the user (UE-1bis) and sends back (S-16, S-08) this information with acknowledge towards the second Access Point (AP-2) where the user has got WLAN connectivity for the second user equipment (UE-1bis).

Regarding the means that the Session Aggregator device (SAD) has for collecting information of authentication and accounting events in order to perform the control check with the event flow machine, the Session Aggregator device (SAD) includes means for receiving a user identifier identifying the user; a terminal or user equipment identifier, such as a MAC address, identifying the terminal which the user accesses with; and a Network Access Server IP address identifying the Access Point where the user accesses through. These identifiers are preferably received as parameters included in the messages indicating to deal with an authentication event (S-13) and with an accounting event (S-15, S-17) received at the Session Aggregator device (SAD) in accordance with the invention.

In accordance with nowadays-preferred embodiments, an Access Authentication Record (AAR) created at the Session Aggregator device (SAD) includes the user identifier used during the authentication procedure that the Access Authentication Record (AAR) corresponds to, the user equipment identifier used during this authentication procedure, and the Access Point IP address having enforced such authentication. The Access Authentication Record (AAR) advantageously includes an indication about the type of authentication performed for the user, and a time measurement indicating the time when the Access Authentication Record (AAR) was created. Likewise, an Aggregated Session Record (ASR) created at the Session Aggregator device (SAD) includes a user identifier used when gaining WLAN connectivity and associated with the access session that the Aggregated Session Record (ASR) corresponds to, a user equipment identifier used during this access session, the Access Point IP address where the access session has been established, and a list including those Access Authentication Records (AAR) associated with this particular Aggregated Session Record (ASR). Advantageously, the Aggregated Session Record (ASR) also includes a time measurements indicating the time when it was created at the Session Aggregator device (SAD).

Moreover, given that the user identifier used for the authentication procedure, namely an authentication identity, might be different than the one used when gaining WLAN connectivity, namely an accounting identity, there is provided in accordance with one embodiment of the invention a global mapping module at the Session Aggregator device (SAD) for correlating authentication identities and accounting identities for each user, an authentication identity being received as the user identifier identifying the user in each indication of an authentication event (S-13), whereas an accounting identity is received as the user identifier identifying the user in each indication of an accounting event (S-15, S-17).

Alternatively, provided that several authentication identities and several accounting identities can be used by a user, a first mapping module may reside in the Authentication Server (Auth-S) for mapping said several authentication identities into a unique user identity identifying the user under the home operator premises, and a second mapping module may reside in the Accounting Server (Acc-S) for mapping said several accounting identities into the unique user identity identifying the user under the home operator premises. Said unique user identity, which identifies the user under the home operator premises, is used by both Authentication Server (Auth-S) and Accounting Server (Acc-S) as the user identifier identifying the user in each respective indication of an authentication event (S-13) and an accounting event (S-15).

In a still further alternative embodiment the global mapping module only exists in a centralized subscriber server database under the home operator premises wherein individual queries from the Authentication Server (Auth-S) and the Accounting Server (Acc-S) are directed to obtain a unique user identifier for identifying the user in the Session Aggregator device (SAD).

Further advantages may be obtained by having a centralized Session Aggregator device (SAD) to control user activities when more than one access session can be simultaneously active for a user. An important advantage is the additional support that the Session Aggregator device (SAD) offers for Single Sign-On (hereinafter SSO) services. SSO is an emerging principle whereby a user who has been authenticated once when firstly accessing a first Access Point in a first access network, can access a second Access Point in a second access network without needing a new authentication. Therefore, when the user firstly accesses the second Access Point, the latter instead of enforcing the user authentication triggers an authentication request towards the Authentication Server (Auth-S), this authentication request being also received at the Session Aggregator device (SAD) and therein processed with help of the event flow machine (Event Flow). Moreover, the Session Aggregator device (SAD) can be also contacted from a Service Network, which offers services to users who are subscribers of the first operator network, in order to verify whether or not a user had been previously authenticated.

The invention is described above in respect of several embodiments in an illustrative and non-restrictive manner. Obviously, variations and combinations of these embodiments are possible in light of the above teachings, and any modification of the embodiments that fall within the scope of the claims is intended to be included therein.

The invention claimed is:

1. A Session Aggregator device for controlling a plurality of access sessions established by a user accessing a wireless local area network through a number of Access Points, the user being subscriber of a first operator network, the Access Points belonging to second operator networks and carrying out access control procedures whereby the user is authenticated by the first operator network, the Session Aggregator device comprising:

means for receiving indication of an authentication event for the user accessing a given Access Point with a given user equipment;

means for receiving indication of an accounting event that includes information related to an access session established for the user at the given Access Point with the given user equipment;

authorization means arranged to make a decision on whether the user is allowed to access the given Access Point as receiving information of authentication events, and based on other access sessions that the user has established; and processing means arranged to determine whether present course of actions corresponds to a permissible flow, or to a possible fraudulent flow as receiving information of accounting events for the user having an access session at the given Access Point with the given user equipment.

2. The Session Aggregator device of claim 1, wherein the authorization means includes means for creating an Access Authentication Record for the user once an authentication event is received indicating that the user has been authenticated through a given Access Point, the Access Authentication Record comprising:

a user identifier identifying the user addressed in the indication;

an identifier of the user equipment received in the indication; and an identifier of the Access Point that enforced the authentication.

3. The Session Aggregator device of claim 2, wherein a first Access Authentication Record is created when the user is authenticated through a first Access Point where the user accesses with its user equipment, and a second Access Authentication Record is created when the user is pre-authenticated through a second Access Point with the user equipment.

4. The Session Aggregator device of claim 2, wherein a first Access Authentication Record is created when the user is authenticated through a first Access Point where the user accesses with a first user equipment, and a second Access Authentication Record is created when the user is authenticated through a second Access Point where the user accesses with a second user equipment, the user being allowed to have more than one access session simultaneously active.

5. The Session Aggregator device of claim 2, wherein the Access Authentication Record further comprises an indication about the type of authentication performed for the user, and a time measurement indicative of the time when the Access Authentication Record was created.

6. The Session Aggregator device of claim 2, wherein a first Aggregated Session Record is created when the user has established a first access session through a first Access Point with a first user equipment, and a second Aggregated Session Record is created when the user has established a second access session through a second Access Point with a second user equipment, the user being allowed to have more than one access session simultaneously active.

7. The Session Aggregator device of claim 1, wherein the processing means includes means for creating an Aggregated Session Record for the user, once an accounting event is received indicating that the user has established an access session through a given Access Point, the Aggregated Session Record comprising:

a user identifier identifying the user addressed in the indication;

an identifier of the user equipment received in the indication;

an identifier of the Access Point where the session has been established; and a list of Access Authentication Records associated to this particular Aggregated Session Record.

8. The Session Aggregator device of claim 7, wherein the Aggregated Session Record is updated during a handover procedure to replace a first identifier of a first Access Point, where the user had accessed the user equipment, by a second identifier of a second Access Point where the user has established an access session after having a successful pre-authentication.

9. The Session Aggregator device of claim 7, wherein the Aggregated Session Record is removed when receiving an accounting stop indication corresponding to the access session that the user had established with the user equipment through the Access Point.

10. The Session Aggregator device of claim 7, wherein the Aggregated Session Record further comprises a time measurement indicative of the time when the Aggregated Session Record was created.

11. The Session Aggregator device of claim 1, further comprising a global mapping module for correlating an authentication identity and an accounting identity, the authentication identity being received as the user identifier identifying the user in each indication of authentication event, and the accounting identity being received as the user identifier identifying the user in each indication of accounting event.

12. The Session Aggregator device of claim 1, wherein the first operator network and second operator networks are operated by a same network operator.

13. A method for controlling a plurality of access sessions established by a user accessing a wireless local area network through a number of Access Points, the user being subscriber of a first operator network, the Access Points operated by second operator networks and carrying out access control procedures, the method comprising the steps of:

enforcing a user authentication at an Access Point where the user has accessed with a user equipment;

carrying out a user authentication between the user equipment and an Authentication Server at the first operator network;

establishing an access session that grants access to the user through the Access Point upon successful user authentication; and indicating an accounting start towards an Accounting Server at the first operator network upon the user gaining connectivity on the access session; and characterized by comprising the steps of:

making an authorization decision based on previous access sessions already established for the user with the given user equipment upon indication of an authentication event received at a centralized entity;

determining whether a present course of actions corresponds to a permissible flow, or to a possible fraudulent flow, for the user having the access session at the given Access Point with the given user equipment upon indication of an accounting event received at a centralized entity.

14. The method of claim 13, wherein the step of making an authorization decision includes the steps of:

checking whether the user with a given user identifier is new from an event decision point of view;

checking for a non-new user whether a given identifier of the user equipment is new; and checking for a non-new user with a new identifier of user equipment whether several access sessions are allowed to be simultaneously active for the user.

15. The method of claim 14, wherein checking steps resulting on determining a non-new user with a new identifier of user equipment, and several access sessions not allowed to be simultaneously active for the user, lead to detect a possible fraudulent activity.

16. The method of claim 14, further comprising a step of checking for a non-new user with a non-new identifier of the user equipment whether a given identifier of the Access Point is new, what is understood as an authentication or pre-authentication for the user.

17. The method of claim 13, further comprising a step of creating a first Access Authentication Record for the user once a positive authorization decision has been made for the user to access through a first Access Point with a user equipment, the Access Authentication Record comprising:

a user identifier identifying the user addressed in the indication of an authentication event;

an identifier of the user equipment received in the indication of an authentication event; and an identifier of the Access Point that enforced the authentication.

18. The method of claim 17, further comprising a step of creating a second Access Authentication Record for the user when the user is pre-authenticated through a second Access Point.

19. The method of claim 17, further including a step of creating an Aggregated Session Record for the user, as determining that a positive authorization has been already made for the user to access the given Access Point, and no access session had been indicated yet for this positive authorization, the Aggregated Session Record comprising:

a user identifier identifying the user addressed in the indication of an accounting event;

an identifier of the user equipment received in the indication of an accounting event;

an identifier of the Access Point where the session has been established; and a list of Access Authentication Records associated to this particular Aggregated Session Record.

20. The method of claim 13, wherein the step of determining the present course of actions includes the steps of:

checking whether a successful authentication took place for the user with a given user identifier, with a given identifier of user equipment, and through an Access Point identified by a given identifier; and checking whether any previous access session for this successful authentication had been already indicated.

21. The method of claim 20, wherein checking steps resulting on determining that no successful authentication has taken place for the user with a given user identifier, with a given identifier of the user equipment, and through a given Access Point identified by a given identifier, lead to detect a possible fraudulent activity.

22. The method of claim 20, wherein checking steps resulting in determining that a successful authentication has already taken place for the user and a previous access session for this successful authentication had been already indicated, are understood as a handover procedure being on course.

23. The method of claim 22, further comprising a step of updating an Aggregated Session Record as detecting a handover between a first Access Point and a second Access Point, the updating carried out by replacing an identifier of the first Access Point with an identifier of the second Access Point, and by removing from the list the Access Authentication Record corresponding to the first Access Point.

24. The method of claim 13, further comprising a step of disconnecting a user with an access session established through a given Access Point, the disconnection indicated with an accounting event towards a centralized entity.

25. The method of claim 24, wherein the step of disconnecting includes the steps of: removing the corresponding Access Authentication Record; updating the associated Aggregated Session Record to remove the Access Authentication Record from the list; and removing the Aggregated Session Record when the list is empty.

* * * * *

UNITED STATES PATENT AND TRADEMARK OFFICE
CERTIFICATE OF CORRECTION

Page 1 of 1

PATENT NO. : 7,848,737 B2
APPLICATION NO. : 11/718872
DATED : December 7, 2010
INVENTOR(S) : Ramos Robles et al.

It is certified that error appears in the above-identified patent and that said Letters Patent is hereby corrected as shown below:

In Column 5, Line 42, after "or",
insert -- to a possible fraudulent flow as receiving information of --.

In Column 12, Line 13, delete "(S-1i)" and insert -- (S-11) --, therefor.

In Column 14, Line 67, delete "(S-b0)" and insert -- (S-10) --, therefor.

In Column 16, Line 17, delete "measurements" and insert -- measurement --, therefor.

Signed and Sealed this
Eighth Day of November, 2011

David J. Kappos
*Director of the United States Patent and Trademark Office*